(12) United States Patent
Libin

(10) Patent No.: US 12,045,942 B1
(45) Date of Patent: Jul. 23, 2024

(54) RECOGNIZABLE CLOTHING WITH ADAPTIVE AUGMENTATION CAPABILITIES FOR ENHANCING USER INTERFACE FOR ASYNCHRONOUS PRESENTATIONS AND VIDEO CONFERENCING

(71) Applicant: mmhmm inc., Little Rock, AR (US)

(72) Inventor: Phil Libin, Bentonville, AR (US)

(73) Assignee: mmhmm inc., Little Rock, AR (US)

( * ) Notice: Subject to any disclaimer, the term of this patent is extended or adjusted under 35 U.S.C. 154(b) by 85 days.

(21) Appl. No.: 17/966,425

(22) Filed: Oct. 14, 2022

Related U.S. Application Data

(60) Provisional application No. 63/276,080, filed on Nov. 5, 2021.

(51) Int. Cl.
| | |
|---|---|
| *G06T 19/00* | (2011.01) |
| *G06T 7/11* | (2017.01) |
| *G06V 20/20* | (2022.01) |
| *G06V 40/10* | (2022.01) |

(52) U.S. Cl.
CPC .............. *G06T 19/006* (2013.01); *G06T 7/11* (2017.01); *G06V 20/20* (2022.01); *G06V 40/10* (2022.01); *G06T 2207/30196* (2013.01)

(58) Field of Classification Search
CPC ..................... G06T 19/006; G06T 7/11; G06T 2207/30196; G06V 20/20; G06V 40/10
See application file for complete search history.

(56) References Cited

U.S. PATENT DOCUMENTS

| | | | | |
|---|---|---|---|---|
| 10,755,487 | B1* | 8/2020 | Snibbe .................. | G06V 20/20 |
| 2019/0035153 | A1* | 1/2019 | Dange .................... | G06V 20/20 |
| 2022/0377257 | A1* | 11/2022 | Wilson ................... | G06N 20/00 |
| 2023/0070631 | A1* | 3/2023 | Berger ............... | G06Q 30/0643 |
| 2023/0078483 | A1* | 3/2023 | Berger .................. | G06V 20/20 |
| | | | | 345/589 |

* cited by examiner

*Primary Examiner* — King Y Poon
*Assistant Examiner* — Vincent Peren
(74) *Attorney, Agent, or Firm* — Muirhead and Saturnelli, LLC

(57) ABSTRACT

Augmenting a presentation includes a presenter wearing clothing having specific visual characteristics, obtaining an image of the presenter, detecting the specific visual characteristics in the image of the presenter, creating an augmented image of the presenter by adding to the image one or more virtual components that vary according to the specific visual characteristics, and presenting the augmented image to a plurality of participants of the presentation on computer screens that are viewed by the participants. The specific visual characteristics may include a special pattern, an emblem, a sticker, fashion style, and/or color. Adding one or more virtual components may include superimposing different clothing onto the image of the presenter. The different clothing may alter color, patterns, textures, fit, fashion, character type, and/or material properties of original clothing of the presenter. Adding virtual components may include adding one or more external components that are separate from the presenter.

20 Claims, 6 Drawing Sheets

RECOGNIZABLE CLOTHING WITH ADAPTIVE AUGMENTATION CAPABILITIES FOR ENHANCING USER INTERFACE FOR ASYNCHRONOUS PRESENTATIONS AND VIDEO CONFERENCING

CROSS-REFERENCE TO RELATED APPLICATIONS

This application claims priority to U.S. Prov. App. No. 63/276,080, filed on Nov. 5, 2021, and entitled "RECOGNIZABLE CLOTHING WITH ADAPTIVE AUGMENTATION CAPABILITIES FOR ENHANCING VIDEO CONFERENCING USER INTERFACE", which is incorporated herein by reference.

TECHNICAL FIELD

This application is directed to the fields of video recording, visual communications, and user interfaces, and more particularly to the field of enhancing user interfaces for pre-recorded presentations and for video conferencing.

BACKGROUND OF THE INVENTION

Augmented reality (AR) applications and environments are transforming business and personal communications, presentations, education, and other areas where the hybrid real world and virtual objects are coexisting and interacting. According to expert assessments and industry forecasts, the AR market was valued at $25.3 billion in 2021 and is expected to reach over $550 billion by 2030, expanding at a compound annual growth rate (CAGR) of 40.9% from 2022 to 2030.

Software applications represent the fastest growing segment of the AR market. Despite the surging demand for AR devices and applications in healthcare, retail, e-commerce, automotive industry, and other vertical markets, some analysts expect the consumer application segment, where gaming, entertainment, and sports applications employ AR technology to create 3D visual objects, to become the largest augmented reality market by 2030, followed by industrial and healthcare segments. For example, the Pokemon GO mobile game by Niantic/Nintendo has accumulated over 1 billion lifetime downloads and generated over $5 billion in revenue since its release in 2016.

Several dozens of AR development platforms, such as Vuforia, Wikitude, ARKit, ARCore, MaxST, EasyAR, Kudan, and the recent heavyweight entrant Metaverse, offer an extensive set of features for asset creation, modeling, manipulation, integration, interaction, analytics, and other aspects of generating and supporting AR environments.

With the proliferation of video presentations and video conferencing as two key productivity, learning, and communications paradigms for the online distributed workstyle, a new category of immersive software tools, such as the mmhmm application created by mmhmm inc., has emerged. The shifting work and communications pattern toward hybrid presentations and conferencing environments and asynchronous presentations uses enhanced expressive capabilities.

Leading video conferencing solutions, such as Zoom, Google Meet or Webex, offer rich collections of virtual backgrounds, including images, animations, and video, sometimes supplemented with additional visual effects. The video conferencing features offered by Zoom, Google Meet or Webex illustrate early Augmented Reality (AR) experiences in video conferencing, long known in multiple types of business-to-business and business-to-consumer communications, education, and other areas.

SUMMARY OF THE INVENTION

Virtual backdrops, as well as fully extraneous AR objects, while playing a role in video presentations, leave the presenter, a participant of an asynchronous video presentation or an immersive video conference, with a traditional arsenal of visual expressive means, such as facial expressions, gaze direction, gestures, and postures. Meanwhile, an important visual area associated with the presenter, clothing of the presenter, is not part of conveying the presentation theme. The role of clothing may be predefined before the start of a conference or a presentation and may not be adequate to the developing theme, presentation environment, and varying reactions of the audience.

Advanced AR authoring tools, such as the Snapchat Lens Studio and some of the aforementioned AR development platforms, offer new mechanisms for modeling human body (using point clouds and skeletal models built from video frames captured by user mobile cameras), along with rich cloth simulation features. Unfortunately, the corresponding technological AR potential is left unrealized, lacking the suitable system, process and workflow in the presentation and conferencing contexts.

Accordingly, it is desirable to build systems, methods, and processes to enhance presentation and video conferencing user interface with an augmented and adaptive clothing.

According to the system described herein, augmenting a presentation includes a presenter for the presentation wearing clothing having specific visual characteristics, obtaining an image of the presenter, detecting the specific visual characteristics in the image of the presenter, creating an augmented image of the presenter by adding to the image one or more virtual components that vary according to the specific visual characteristics, and presenting the augmented image to a plurality of participants of the presentation on computer screens that are viewed by the participants. The specific visual characteristics may include a special pattern, an emblem, a sticker, fashion style, and/or color. Adding one or more virtual components may include superimposing different clothing onto the image of the presenter. The different clothing may alter color, patterns, textures, fit, fashion, character type, and/or material properties of original clothing of the presenter. The different clothing may be fit on to the presenter based on stored measurements of a model that approximates the presenter. The different clothing may be fit on to the presenter using an estimate based on the image of the presenter. The presenter may wear a t-shirt and superimposing different clothing on the presenter may include identifying a chest area of the presenter to make a bounding box around the chest area within a contour of the t-shirt. Enhanced segmentation technology may be used to identify the chest area of the presenter. The chest area of the presenter may be identified based on stored measurements of a model that approximates the presenter. The chest area of the presenter may be estimated based on the image of the presenter. A color or pattern of the t-shirt may be cycled periodically within the bounding box. Adding one or more virtual components may include adding one or more external components that are separate from the presenter. Augmenting a presentation may also include providing a first augmentation schema in response to the specific visual characteristics, the first augmentation schema having a first set of virtual components that include the clothing and external components related to the clothing. The first augmentation schema may also include character types for the presenter to assume, activities for the presenter to perform, and/or specific behaviors for the external components. At least one of the external components may be animated. Augmenting a presentation may also include replacing the first augmentation schema with a second, different, augmentation schema in response to feedback of the participants to the first augmentation schema, the second augmentation schema having a second set of virtual components, different from the first set of virtual components, that include related clothing and external components.

According further to the system described herein, a non-transitory computer readable medium contains software that augments a presentation having a presenter wearing clothing having specific visual characteristics. The software includes executable code that obtains an image of the presenter, executable code that detects the specific visual characteristics in the image of the presenter, executable code that creates an augmented image of the presenter by adding to the image one or more virtual components that vary according to the specific visual characteristics, and executable code that presents the augmented image to a plurality of participants of the presentation on computer screens that are viewed by the participants. The specific visual characteristics may include a special pattern, an emblem, a sticker, fashion style, and/or color. Adding one or more virtual components may include superimposing different clothing onto the image of the presenter. The different clothing may alter color, patterns, textures, fit, fashion, character type, and/or material properties of original clothing of the presenter. The different clothing may be fit on to the presenter based on stored measurements of a model that approximates the presenter. The different clothing may be fit on to the presenter using an estimate based on the image of the presenter. The presenter may wear a t-shirt and superimposing different clothing on the presenter may include identifying a chest area of the presenter to make a bounding box around the chest area within a contour of the t-shirt. Enhanced segmentation technology may be used to identify the chest area of the presenter. The chest area of the presenter may be identified based on stored measurements of a model that approximates the presenter. The chest area of the presenter may be estimated based on the image of the presenter. A color or pattern of the t-shirt may be cycled periodically within the bounding box. Adding one or more virtual components may include adding one or more external components that are separate from the presenter. The software may also include executable code that provides a first augmentation schema in response to the specific visual characteristics, the first augmentation schema having a first set of virtual components that include the clothing and external components related to the clothing. The first augmentation schema may also include character types for the presenter to assume, activities for the presenter to perform, and/or specific behaviors for the external components. At least one of the external components may be animated. The software may also include executable code that replaces the first augmentation schema with a second, different, augmentation schema in response to feedback of the participants to the first augmentation schema, the second augmentation schema having a second set of virtual components, different from the first set of virtual components, that include related clothing and external components.

The proposed system creates a collection of recognizable clothing and AR variations of the clothing, dynamically or statically replacing the original clothing during a presentation, where recognition of clothing of an original presenter may be implemented via a characteristic decorative pattern or image imprinted or otherwise presented on the clothing, a sticker, emblem, or details of the fashion. Original recognizable clothing models (such as t-shirts) may be further assigned different character types, augmented components, activity types, and behaviors, forming together augmentation schemas—the conduits of variations of the original clothing (and, optionally, the potential associated extraneous objects) following the recognition of the original clothing by the system. Augmentation schemas may be multi-variant and may additionally react and adapt to participant or viewer feedback.

Various aspects of system architecture and functioning are explained as follows.

1. Physical and virtual clothing as a presentation tool. Immersive video presentations and conferences enabled by mmhmm and other recent software titles are continuously capturing an image of a presenter with a front camera of the presenter, separate is from a physical background (environment of the presenter) and immersing the image into a presentation space of the presenter, as described in U.S. patent application Ser. No. 17/323,137 titled: "INDIVIDUAL VIDEO CONFERENCING SPACES WITH SHARED VIRTUAL CHANNELS AND IMMERSIVE USERS", filed on May 18, 2021 by Libin, and incorporated by reference herein. A portion of clothing of the presenter captured by the camera is part of the image of the immersed presenter. The portion of the clothing may be altered in a hybrid environment of an individual presentation or video conferencing space, may be partially or completely replaced with an augmented virtual clothing, enhanced by image effects, supplemented with other augmented objects, supplied with diverse behaviors, etc., enhancing the presentation or communications with participants of a video conference.

Augmented clothing may be completely controlled by a presenter or by assistant(s) of the presenter during a presentation; alternatively, the appearance, properties and behavior of the virtual augmented clothing may be encoded in the original physical clothing through recognizable patterns, colors, emblems, stickers, fashions, etc. Described herein is the second option when the system decodes the parameters and properties of the augmented clothing encoded in the original clothing.

2. Examples of augmented clothing. Below are several examples of augmented clothing differing by parameters and complexity:
   a. Fitting augmented clothing. At the start of a presentation, a presenter may wear a loose t-shirt with a special pattern, emblem or sticker encoding a requirement for the augmented t-shirt to fit the body of the presenter by some criteria. Accordingly, upon decoding the requirement, the system optimizes the augmented unit to fit the presenter, using available measurements and model of the body of the presenter (which may be limited to appearance of the presenter at the start of the presentation or may be known from previous encounters of the same presenter with the system). Various other criteria, such as the color and material of the augmented clothing resembling the original t-shirt, may also be taken into account.
   b. Color cycling. A presenter wears a t-shirt designed with a constrained palette and encoding a color cycling request in a special pattern or other design elements. The system recognizes the t-shirt, uses an enhanced segmentation technology to identify the chest area of the presenter, makes a bounding box around the chest and within the contour of the t-shirt and uses color cycling techniques to animate the t-shirt. Note that the identification of the chest area of the presenter may use the same data and technique of body measurement that has been explained above in conjunction with the fitting virtual clothing.

c. Characters, extraneous augmented objects, and behaviors. Upon recognizing a pattern, décor or other characteristic features of the clothing of the presenter, the system may associate additional extraneous augmented objects with the presentation, where some of the associated objects may be static and other objects may be dynamic and may manifest assigned characters, follow predefined behaviors, and implement various scenarios, enhancing the original presentation and partially or fully controlled by the presenter.

3. System components and attributes. The system for adaptive augmentation of clothing of the presenter for enhancing user interfaces for video presentations and video conferencing may include the following components:

(i) A database of recognizable clothing with a pattern recognition sub-component. Clothing may be identified by several properties, such as a recognizable pattern, emblem or sticker, fashion, pattern/color combination, etc.

(ii) Augmented Reality components, which broadly include augmented clothing (various models, fashions, styles, sizes, etc., replacing the original clothing of the presenter), décor (color, patterns, textures, properties of material, etc.), and extraneous virtual objects (for example, a pirate hat, a hatchet, and a parrot for an adventurous presenter character used for entertainment purposes during a conference or presentation break).

(iii) An activity type—static or dynamic. Static activity changes the appearance of clothing and the rest of the AR scene once, while dynamic activity develops during a presentation session.

(iv) Characters, such as a business-like or an adventurous character, which may be further specified as an entrepreneur, an executive or a factory worker for the business-like characters or as a traveler, a hunter, or a pirate for an adventurous type. Characters, in their turn, may determine the type of AR scenario, the clothing style, the set of extraneous objects, etc.

(v) Behaviors, assigned to AR components, such as the appearance of the clothing and the décor (for example, the already mentioned fitting property and color cycling) and to extraneous objects, such as movement routines of the AR components and interactions of the AR components with the presenter.

4. Augmentation schemas. The full scenario of augmentation of adaptive clothing in a particular situation may be defined by an augmentation schema, which may include a unit or a set of recognizable clothes (in case when many different units generate the same augmentation scenario) and a set of assigned values of all other system components and attributes.

For example, an augmentation schema for the pirate scenario may include a. Two recognizable shirts, one with a pirate sword sticker, another with a pirate ship print; upon recognition of any such shirt by the pattern recognition component, the system identifies the schema, finds the rest of the components, and initiates the augmentation scenario.

b. Augmented components:
    i. one type of the augmented clothing, a regular t-shirt;
    ii. two types of prints chosen from the pirate theme, alternating on the chest;
    iii. a pirate hat and a parrot.

c. Activity type—dynamic.

d. Character—adventurous>pirate.

e. Behaviors:
    i. prints on the chest are cycled;
    ii. parrot is initially sitting on the shoulder of the presenter and flying around every minute, returning automatically in 20 seconds or on demand by a gesture of the presenter. Behaviors reflect participant feedback.

5. Participant feedback. Augmentation schemas may include branching scenarios adapted to the user feedback assessed by the system. For example, if the start of a pirate scenario is met with a positive reaction by the audience, as detected by a sentiment recognition system based on facial and gesture recognition and other AI components, then the augmentation scenario may proceed in a most extensive variant of the scenario.

However, if a portion of the audience appears displeased with the augmentation setup, the system may branch the rest of the augmentation development to a moderate portion of the schema and scenario. Thus, in the aforementioned pirate attire scenario, the system may eliminate the pirate hat and parrot and confine the augmentation development to cycling several prints on the chest of the t-shirt based on the pirate theme.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for enhancing a user interface for pre-recorded presentations and video conferences with augmented clothing, décor, extraneous objects, assigned characters and behaviors based on recognizable patterns or fashions of clothing of an immersive current presenter and on associated augmentation schemas.

Figure 1:
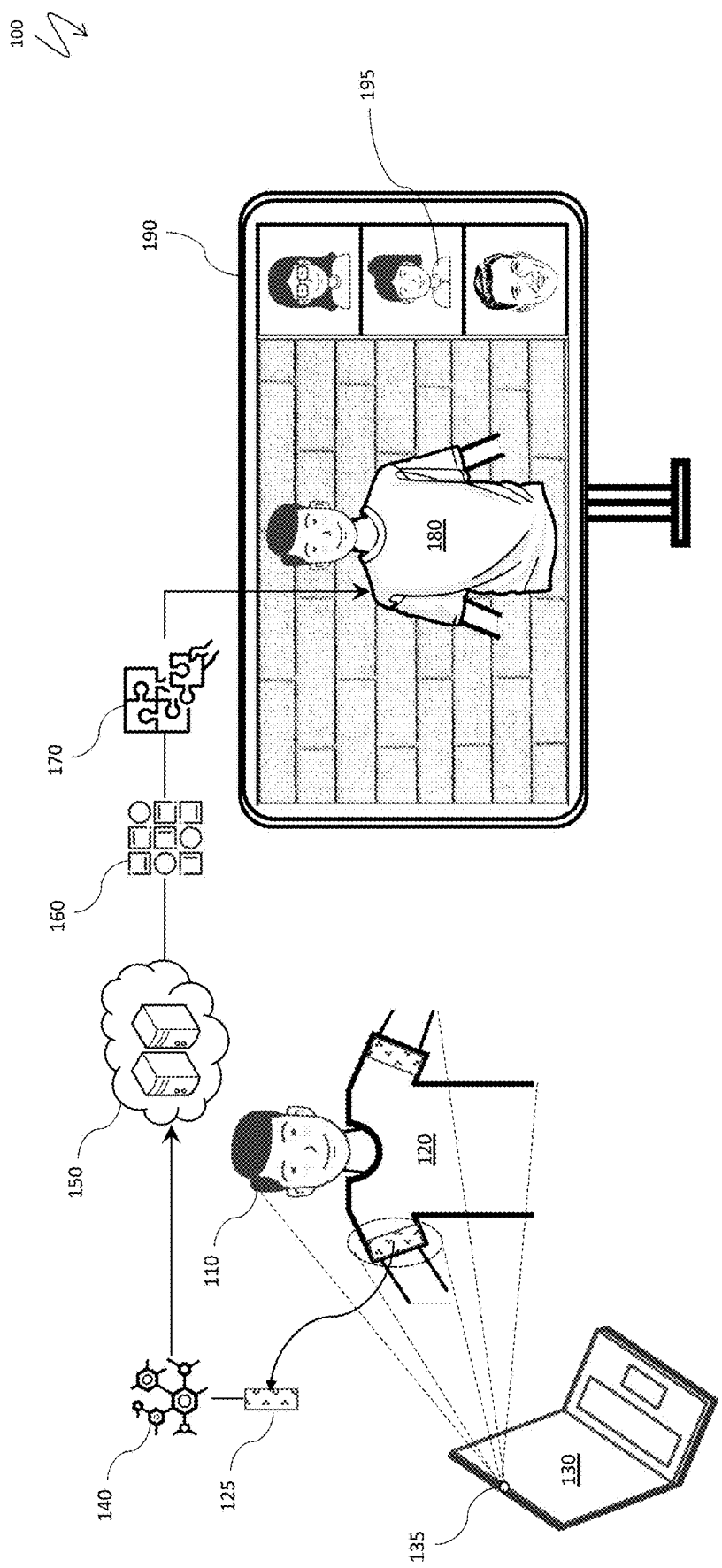
FIG. 1 is a schematic illustration of augmented fitting clothing for a presenter, according to an embodiment of the system described herein.

FIG. 1 is a schematic illustration 100 of augmented fitting clothing for a presenter 110. The presenter 110 wears clothing 120 with a recognizable pattern 125, captured by a computer 130 with a camera 135. Note that there can be many types of capturing technology and equipment. A pattern recognition system 140 recognizes the pattern 125 and may use a cloud system deployment 150 (as well as local system components, not shown in FIG. 1) to transfer pattern recognition results to a classifier 160, which, in the example illustrated herein, chooses an augmentation component 170 of fitting clothing and modifies an image of the clothing 120 to display the presenter 110 wearing a fitting virtual t-shirt 180 on a presentation screen 190 of, for example, a desktop or laptop computer, during an asynchronous pre-recorded presentation or a video conference with participants 195.

Figure 2:
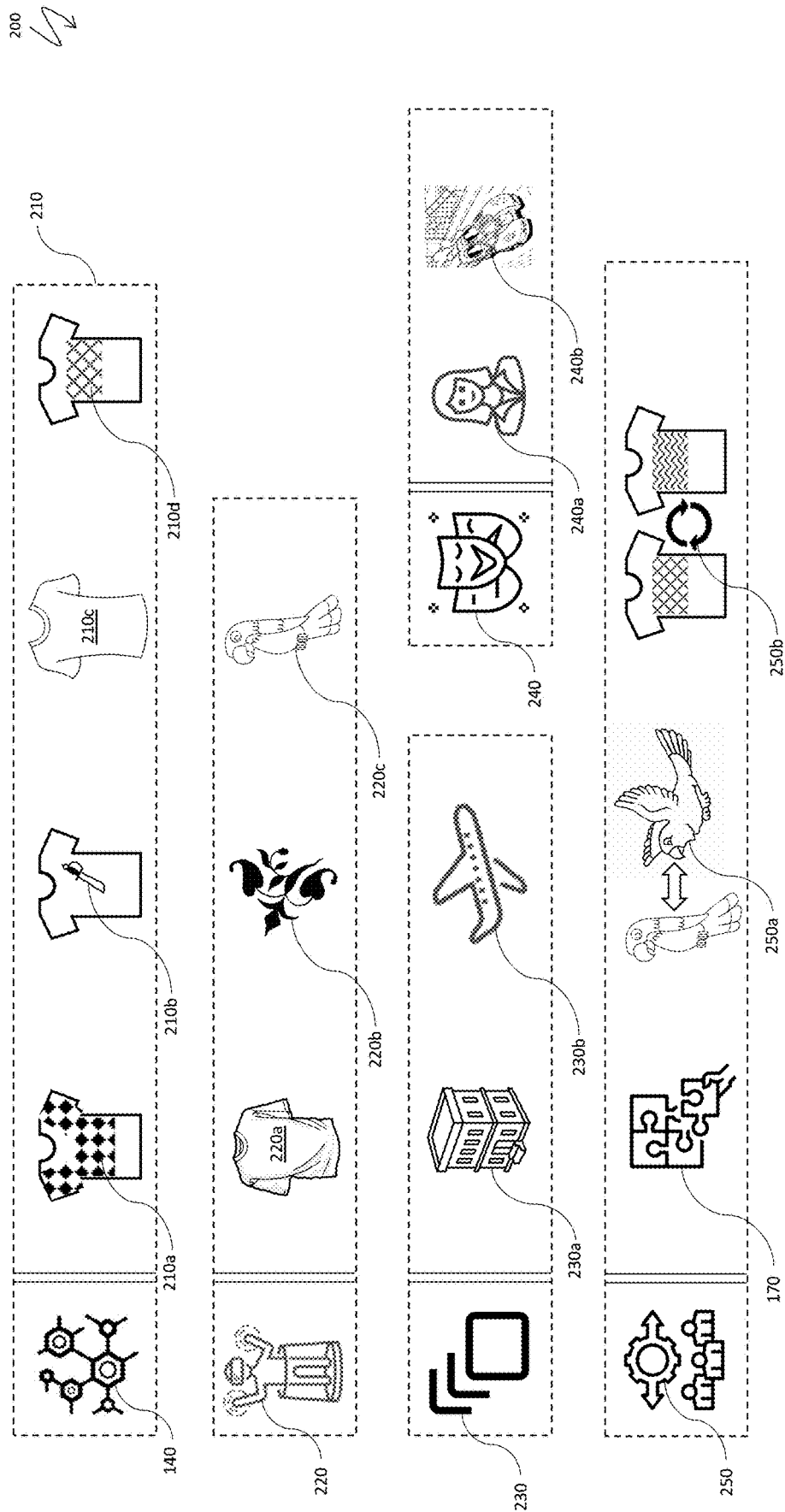
FIG. 2 is a schematic illustration of system components and attributes, according to an embodiment of the system described herein.

FIG. 2 is a schematic illustration 200 of system components and attributes. A collection 210 of recognizable clothing includes several categories of clothing with different recognizable features: recognizable patterns 210a (see, for example, FIG. 1 where the recognizable pattern 125 is located on the sleeve of a t-shirt); recognizable emblems/stickers 210b; recognizable fashions 210c; and recognizable pattern/color combinations 201d. The pattern recognition component 140 of the system provides identification technology for all categories of the collection 210.

Augmented components 220 of the presentation associated with a particular recognizable clothing item may include the clothing 220a (for example, the fitting virtual t-shirt 180, explained in FIG. 1 and the accompanying text); décor 220b; and extraneous objects 220c, further enhancing the user interface of a presentation.

Predominant activity type 230, assigned to each of the augmented components 220, may be static 230a or dynamic 230b. For example, a bird (an extraneous augmented object) may be sitting on a shoulder of the presenter 110 (static activity) or flying around a presentation space (dynamic activity).

Characters 240 assigned to each of the augmented components 220 may have multiple types, for example, a business-like 240a, an adventurous 240b, etc.

Behaviors 250 of each of the augmented components 220 may be associated with all other system components and attributes, for example, the fitting virtual t-shirt 180 (see FIG. 1), moving extraneous objects 250a, cycling colors on a clothing item 250b, etc.

Figure 3:
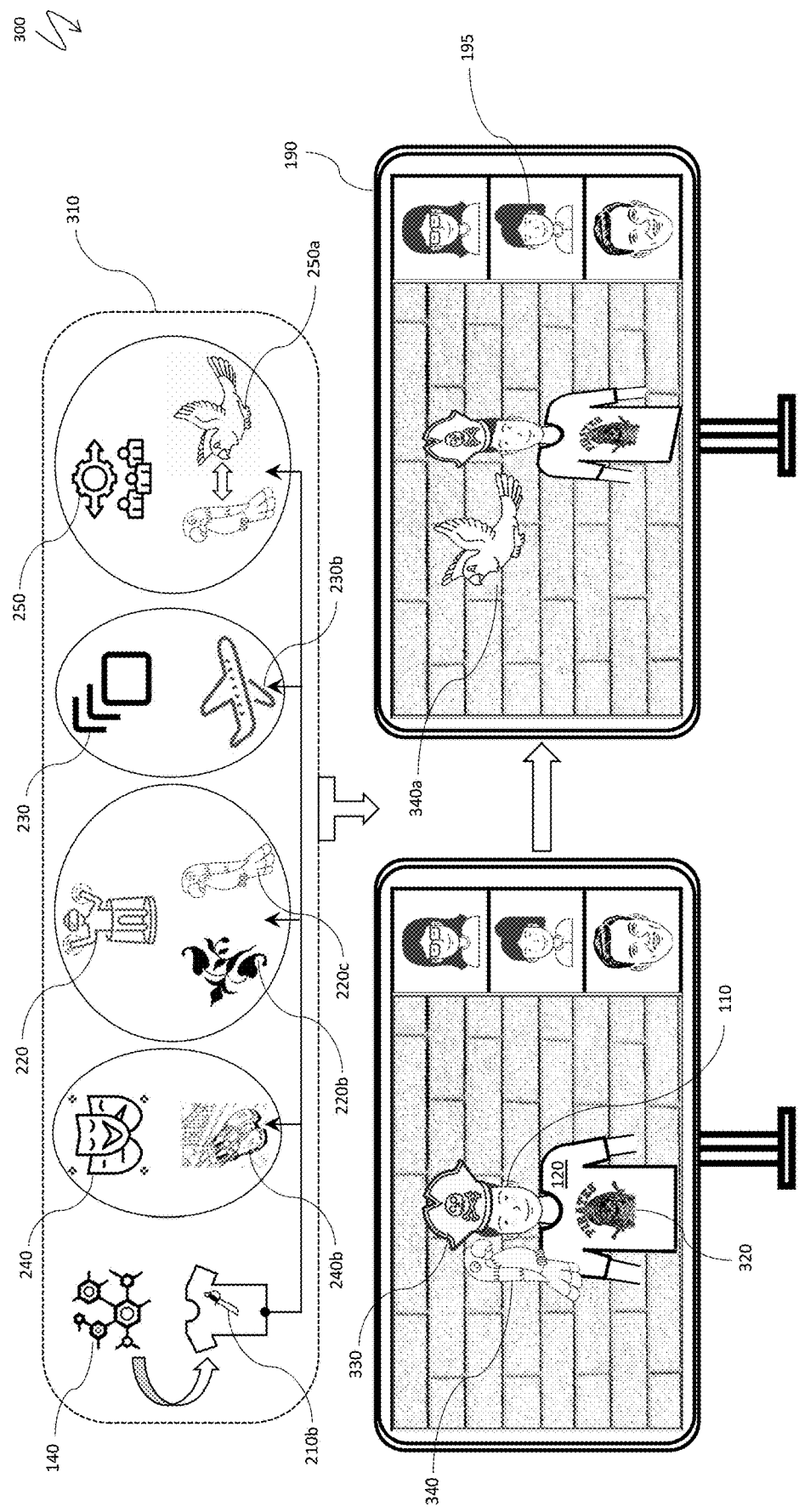
FIG. 3 is a schematic illustration of augmented clothing with extraneous objects, according to an embodiment of the system described herein.

FIG. 3 is a schematic illustration 300 of augmented clothing with extraneous objects. As explained in Section 4 of the Summary, a presentation scenario associated with augmented clothing may be driven by an augmentation schema. In FIG. 3, an augmentation schema 310 is generated by original clothing of the presenter 110 where the recognizable material is a sticker. Once identified by the pattern recognition component 140, the clothing initiates a "pirate scenario" with the following additional content:
 the character 240—adventurous (the category 240b);
 the augmented components 220 include the décor 220b, further specified as a printed emblem 320 on the clothing 120, and the extraneous objects 220c, identified as a pirate hat 330 and a parrot 340;
 the activity type 230 is dynamic (the category 230b);
 the behavior 250 applies to the parrot as a moving extraneous object (the behavior category 250a).

The resulting presentation scenario is shown on the screens 190, where the presenter 110 is wearing the clothing 120 with the printed emblem 320 and the hat 330, while the parrot 340 may sit on a shoulder of the presenter 110 or fly around a presentation space 340a. The presentation may be an asynchronous recording or a synchronous video conference with the participants 195 (see FIG. 1).

Figure 4:
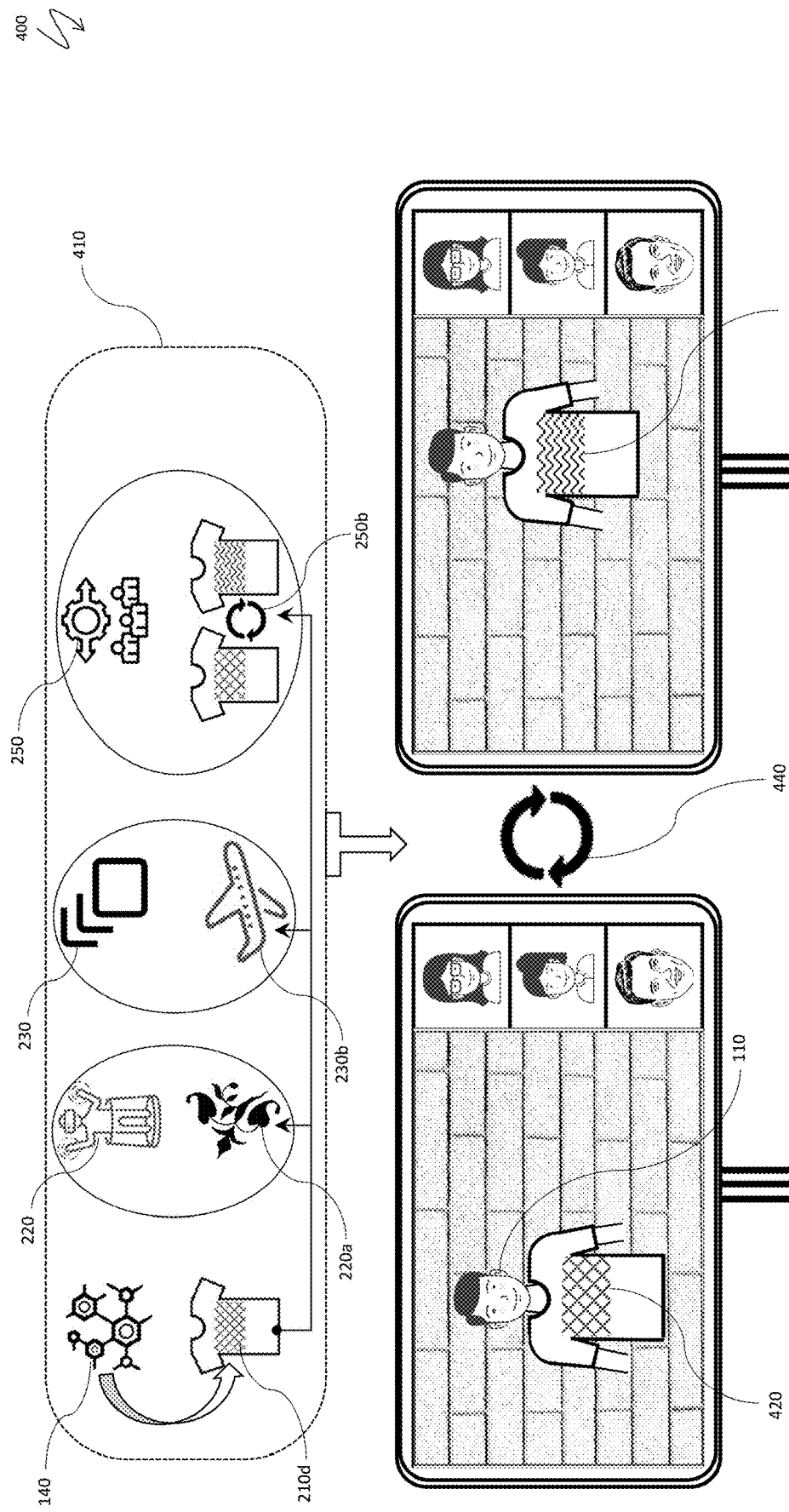
FIG. 4 is a schematic illustration of augmented clothing with color cycling, according to an embodiment of the system described herein.

FIG. 4 is a schematic illustration 400 of augmented clothing with color cycling. An augmentation schema 410 is generated by initial clothing of the presenter 110 in the category 210d (pattern/color combo). Once recognized by the technology component 140 (see FIGS. 1-3 and the accompanying text), the technology component 140 initiates a color cycling scenario with the augmented components 220 represented by the décor 220a, further specified as a set of varying combinations 420, 430 of colors of the imprinted pattern on the clothing of the presenter 110, the activity type 230 is dynamic (change of color), there are no characters assigned to augmented components, and the behavior 250 is the color cycling 250b (see FIG. 2). Note that the change of color 440 is represented in the black-and-white FIG. 4 as the change of patterns from the combination 420 to the combination 430. Analogously to FIG. 3, the presentation with the scenario and augmentation schema illustrated in FIG. 3 may be asynchronous or synchronous (notations for the video conference and the presentation screens are not displayed).

Figure 5A:
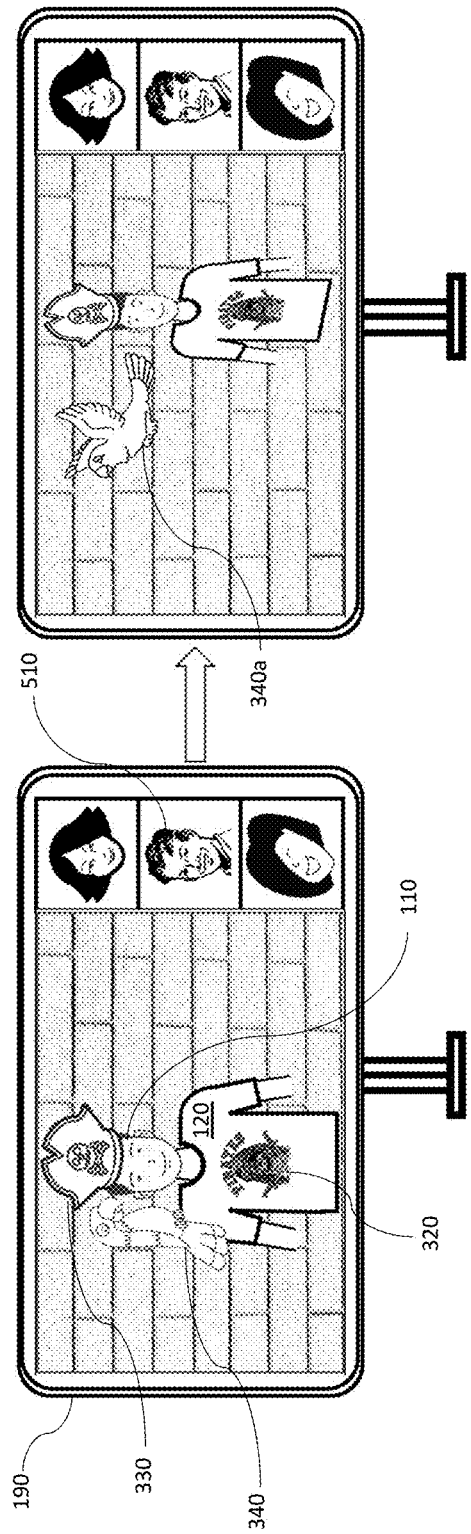
FIGS. 5A-5B are schematic illustrations of executing and altering augmentation schemas based on audience feedback, according to an embodiment of the system described herein.
Figure 5B:
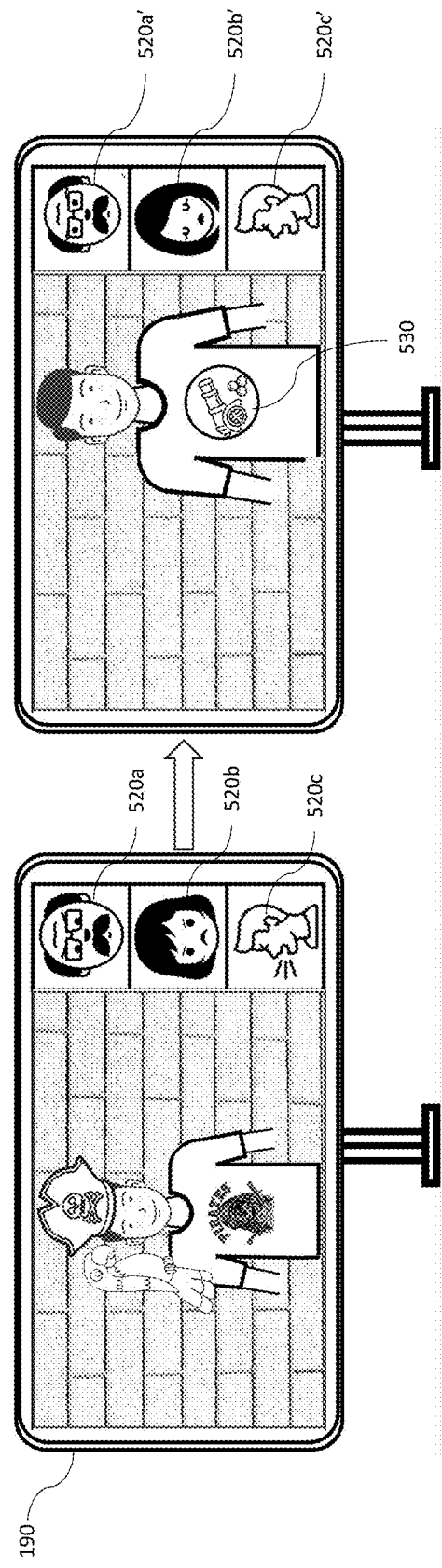

FIGS. 5A-5B are schematic illustrations of executing and altering augmentation schemas based on the audience feedback.

FIG. 5A shows a scenario of augmented clothing with extraneous objects, explained in conjunction with FIG. 3 and conducted in connection with a video conference. In FIG. 5A, the presenter 110 is running a "pirate scenario" and wearing the augmented clothing 120, modified by the imprint 320, and the hat 330, featuring the parrot 340. The scenario of FIG. 5A, displayed on the presentation screen 190, is favorably viewed by a plurality of participants 510 of the video conference (illustrated in FIG. 5A by facial expressions of the participants 510), so the system runs a full scenario, subject to the original augmentation schema and illustrated by the parrot 340a flying.

FIG. 5B shows a scenario of augmented clothing with extraneous objects, explained in conjunction with FIG. 3, conducted in connection with a video conference and similar to the scenario of FIG. 5A. The difference between FIG. 5A and FIG. 5B is in the feedback of video conference participants: all three participants 520a, 520b, 520c react negatively to the introduction of the scenario of FIG. 5B (on left). Accordingly, the system may detect the unfavorable attitude of the audience and may replace the full scenario with a modest periodic change of the emblem 320 to a different emblem 530 (the change may be a dynamic sequence, analogous to FIG. 4). The subsequent neutral to positive reaction of the participants 520a', 520b', 520c' may allow the system to proceed with the modified augmentation schema.

Figure 6:
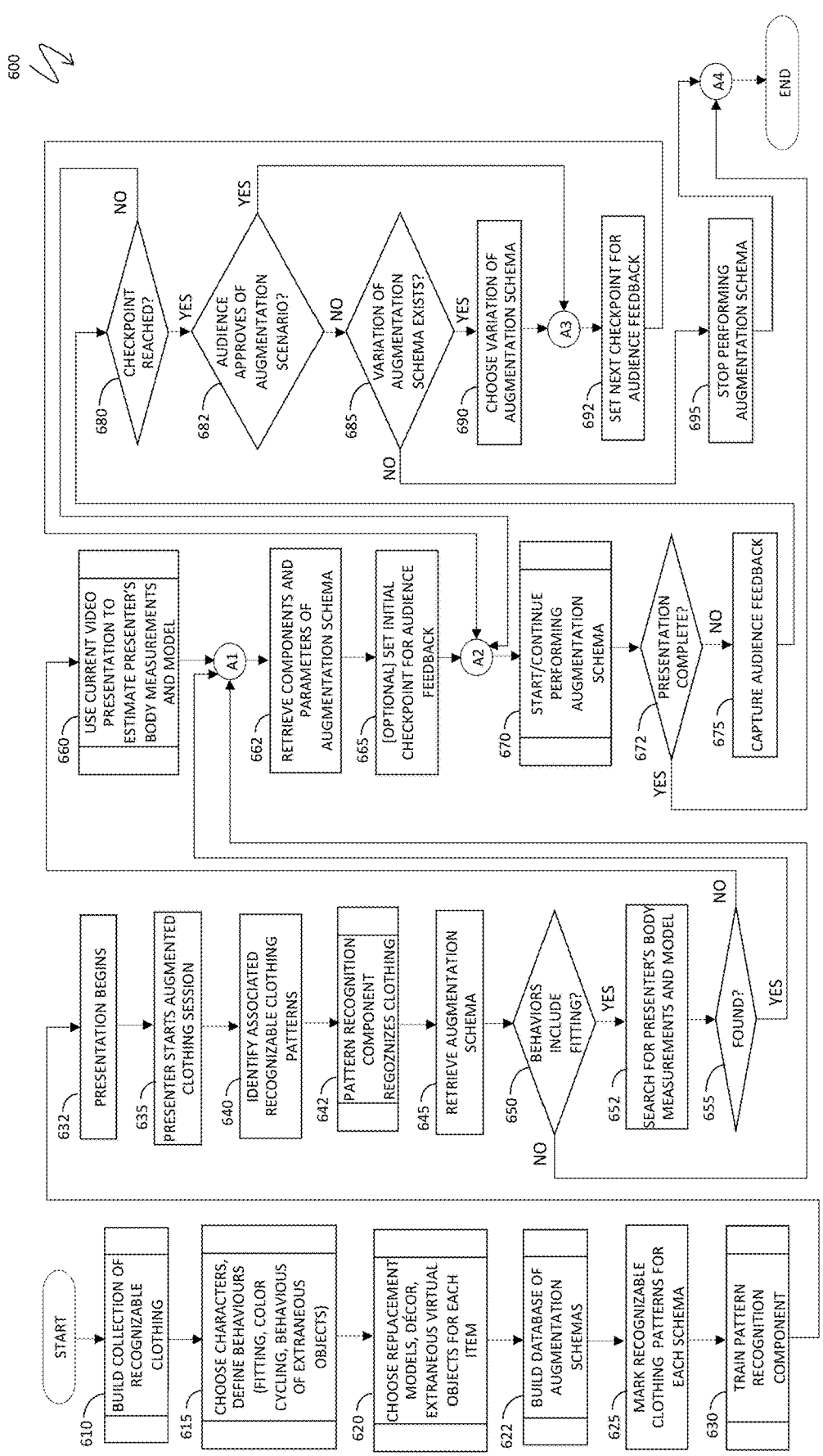
FIG. 6 is a system flow diagram illustrating system functioning in connection with using augmented clothing in presentations, according to an embodiment of the system described herein.

Referring to FIG. 6, a system flow diagram 600 illustrates system functioning in connection with using augmented clothing in presentations. Processing begins at a step 610, where a collection of recognizable clothing is built (see FIG. 2 for details and categories of recognizable clothing). After the step 610, processing proceeds to a step 615, where the characters are chosen and the behaviors are defined for each item in the collection of recognizable clothing. After the step 615, processing proceeds to a step 620, where the replacement models of clothing, décor options, and extraneous virtual objects are chosen for each item in the collection (see FIG. 2 for extended descriptions of the steps 615 and 620). After the step 620, processing proceeds to a step 622, where a database of augmentation schemas representing multiple presentation scenarios is created, as explained elsewhere herein (see FIGS. 3, 4 for the examples of augmentation schemas).

After the step 622, processing proceeds to a step 625, where the recognizable clothing patterns are marked for each augmentation schema (note that the database of augmentation schemas built on the step 622 may include a broad set of training samples for each item of recognizable clothing). After the step 625, processing proceeds to a step 630, where the pattern recognition component of the system (the item 140 in FIGS. 1-4) is trained to reliably recognize every recognizable clothing entry from the database built at the step 610.

After the step 630, processing proceeds to a step 632, where a presentation begins. After the step 632, processing proceeds to a step 635, where the presenter starts an augmented clothing session (in particular, clothing of the presenter is segmented out from the image of the presenter, captured, processed, and immersed into the presentation scene, as explained elsewhere herein). After the step 635, processing proceeds to a step 640, where the system identifies recognizable clothing patterns on the clothing of the presenter (see, for example, FIG. 1 and the accompanying text). After the step 640, processing proceeds to a step 642, where the pattern recognition component recognizes the clothing, as explained in FIGS. 1-4 and in the accompanying texts. After the step 642, processing proceeds to a step 645, where the system retrieves an augmentation schema (or a set of augmentation schemas where replacements are provided) from the database based on the recognized clothing. After the step 645, processing proceeds to a test step 650, where it is determined whether there is a behavior associated with the clothing of the presenter that includes fitting of the clothing. If so, processing proceeds to a step 652, where the system searches for the body measurements and model for the presenter, captured and built prior to the presentation. After the step 652, processing proceeds to a test step 655, where it is determined whether the body measurement and model for the presenter were found. If not, processing proceeds to the step 660, where the system uses the current video presentation (and more specifically, the immersed dynamic images of the presenter) to estimate the body measurements and model for the presenter.

After the step 660, processing proceeds to a step 662, where the system retrieves components and parameters of the augmentation schema(s) obtained at the step 645. Note that the step 662 may be independently reached from the test step 650 if it is determined that there is no behavior associated with the clothing of the presenter that includes fitting of the clothing in the augmentation schema, and from the test step 655 if it is determined that the body measurement and model for the presenter is found by the system. After the step 662, processing proceeds to an optional step 665, where an initial checkpoint for the audience feedback is set (as a timestamp, a series of conditions or otherwise). The step 665 is performed in cases where the presentation is part of a video conference or a similar event that includes current participants capable of interacting with the system and, directly, or indirectly, with the presenter.

After the step 665, processing proceeds to a step 670, where the presenter and the system start or continue performing the augmentation schema. After the step 670, processing proceeds to a test step 672, where it is determined whether the presentation is done. If so, processing is complete; otherwise, processing proceeds to a step 675, where the system captures, assesses, and accumulates audience feedback. Note that the step 675 and subsequent steps (described below) are describing the aforementioned case of a video conference or other synchronous communications where the audience may interact, explicitly or implicitly, with the presenter and influence the presentation flow through such interactions.

After the step 675, processing proceeds to a test step 680, where it is determined whether a checkpoint for the audience feedback is reached. If not, processing proceeds to the step 670, which may be independently reached from the step 665; if it is determined at the test step 680 that a checkpoint for the audience feedback is reached, processing proceeds to a test step 682, where it is determined whether the audience approves of the current augmentation scenario. If not, processing proceeds to a test step 685, where it is determined whether a variation of the augmentation schema exists (see FIGS. 5A-5B and the accompanying text for more info). If so, processing proceeds to a step 690, where a variation of the augmentation schema is chosen. After the step 690, processing proceeds to a step 692, where a next checkpoint for checking audience feedback is set. After the step 692, processing proceeds back to the step 670, which may be independently reached from the step 665 and from the test step 680.

If it is determined at the test step 685 that variations of the augmentation schema do not exist for the current presentation, processing proceeds to a step 695, where the system and the presenter stop performing the augmentation schema. After the step 695, processing is complete. If it is determined at the test step 682 that the audience approves of the augmentation scenario, processing proceeds to a step 692, which may be independently reached from the step 690.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: iOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of augmenting a presentation, comprising:
   a presenter for the presentation wearing clothing having specific visual characteristics;
   obtaining an image of the presenter;
   detecting the specific visual characteristics in the image of the presenter;
   creating an augmented image of the presenter by adding to the image one or more virtual components that vary according to the specific visual characteristics; and
   presenting the augmented image to a plurality of participants of the presentation on computer screens that are viewed by the participants, wherein adding one or more virtual components includes superimposing different clothing onto the image of the presenter that alters at least one of: color, patterns, textures, fit, fashion, character type, or material properties of original clothing of the presenter and wherein the presenter wears a t-shirt and wherein superimposing different clothing on the presenter includes identifying a chest area of the presenter to make a bounding box around the chest area and within a contour of the t-shirt.

2. The method of claim 1, wherein the specific visual characteristics include at least one of: a special pattern, an emblem, a sticker, fashion style, or color.

3. The method of claim 1, wherein the different clothing is fit on to the presenter based on stored measurements of a model that approximates the presenter.

4. The method of claim 1, wherein the different clothing is fit on to the presenter using an estimate based on the image of the presenter.

5. The method of claim 1, wherein enhanced segmentation technology is used to identify the chest area of the presenter.

6. The method of claim 1, wherein the chest area of the presenter is identified based on stored measurements of a model that approximates the presenter.

7. The method of claim 1, wherein the chest area of the presenter is estimated based on the image of the presenter.

8. The method of claim 1, wherein a color or pattern of the t-shirt is cycled periodically within the bounding box.

9. The method of claim 1, wherein adding one or more virtual components also includes adding one or more external components that are separate from the presenter.

10. The method of claim 1, further comprising:
    providing a first augmentation schema in response to the specific visual characteristics, the first augmentation schema having a first set of virtual components that include the clothing and external components related to the clothing.

11. The method of claim 10, wherein the first augmentation schema also includes at least one of: character types for the presenter to assume, activities for the presenter to perform, and specific behaviors for the external components.

12. The method of claim 10, wherein at least one of the external components is animated.

13. The method of claim 10, further comprising:
    replacing the first augmentation schema with a second, different, augmentation schema in response to feedback of the participants to the first augmentation schema, the second augmentation schema having a second set of virtual components, different from the first set of virtual components, that include related clothing and external components.

14. A non-transitory computer readable medium containing executable code which, when executed by a processor, causes the processor to perform a method of augmenting a presentation by a presenter wearing clothing having specific visual characteristics, the method comprising:
    obtaining an image of the presenter;
    detecting the specific visual characteristics in the image of the presenter;
    creating an augmented image of the presenter by adding to the image one or more virtual components that vary according to the specific visual characteristics; and
    presenting the augmented image to a plurality of participants of the presentation on computer screens that are viewed by the participants, wherein adding one or more virtual components includes superimposing different clothing onto the image of the presenter that alters at least one of: color, patterns, textures, fit, fashion, character type, or material properties of original clothing of the presenter and wherein the presenter wears a t-shirt and wherein superimposing different clothing on the presenter includes identifying a chest area of the presenter to make a bounding box around the chest area and within a contour of the t-shirt.

15. The non-transitory computer readable medium of claim 14, wherein the specific visual characteristics include at least one of: a special pattern, an emblem, a sticker, fashion style, or color.

16. The non-transitory computer readable medium of claim 14, wherein the different clothing is fit on to the presenter either based on stored measurements of a model that approximates the presenter or using an estimate based on the image of the presenter.

17. The non-transitory computer readable medium of claim 14, wherein enhanced segmentation technology is used to identify the chest area of the presenter.

18. The non-transitory computer readable medium of claim 14, wherein the chest area of the presenter is identified based on stored measurements of a model that approximates the presenter.

19. The non-transitory computer readable medium of claim 14, wherein the chest area of the presenter is estimated based on the image of the presenter.

20. The non-transitory computer readable medium of claim 14, wherein a color or pattern of the t-shirt is cycled periodically within the bounding box.

* * * * *